US006928344B2

(12) United States Patent
McWalter et al.

(10) Patent No.: US 6,928,344 B2
(45) Date of Patent: Aug. 9, 2005

(54) VEHICLE MODE MANAGER

(75) Inventors: William F. McWalter, Stirling (GB); Dianna L. Decristo, Venice, CA (US); Lisa M. Kelly, Cupertino, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 10/106,656

(22) Filed: Mar. 25, 2002

(65) Prior Publication Data

US 2003/0182032 A1 Sep. 25, 2003

(51) Int. Cl.[7] ........ G06F 7/00
(52) U.S. Cl. ........ 701/29; 701/35
(58) Field of Search ........ 701/29, 35, 31, 701/34, 36; 307/9.1, 10.1, 10.2

(56) References Cited

U.S. PATENT DOCUMENTS

| | | | | |
|---|---|---|---|---|
| 5,479,157 A | * 12/1995 | Suman et al. | 340/5.28 |
| 5,848,365 A | * 12/1998 | Coverdill | 701/35 |
| 5,919,239 A | 7/1999 | Fraker et al. | |
| 6,232,873 B1 | 5/2001 | Dilz et al. | |
| 6,480,144 B1 | * 11/2002 | Miller et al. | 342/72 |
| 2002/0173889 A1 | * 11/2002 | Odinak et al. | 701/36 |

FOREIGN PATENT DOCUMENTS

| | | |
|---|---|---|
| DE | 19621425 A1 | 12/1997 |
| EP | 0890937 A2 | 1/1999 |
| EP | 1081670 A2 | 3/2001 |
| GB | 2288892 A | 11/1995 |
| WO | WO 99/23783 | 5/1999 |

OTHER PUBLICATIONS

U.S. Appl. No. 10/104,267, filed Mar. 22, 2002, entitled "Adaptive Connection Routing Over Multiple Communication Channels".
U.S. Appl. No. 10/105,121, filed Mar. 22, 2002, entitled "Arbitration of Communication Channel Bandwidth".
U.S. Appl. No. 10/104,351, filed Mar. 22, 2002, entitled "System and Method for Distributed Prefernce Data Services".
U.S. Appl. No. 10/104,297, filed Mar. 22, 2002, entitled "Asynchronous Protocol Framework".
U.S. Appl. No. 10/104,298, filed Mar. 22, 2002, entitled "Business–Model Agnostic Service Deployment Management Service".
U.S. Appl. No. 10/104,295, filed Mar. 22, 2002, entitled "Manager Level Device/Service Arbitrator".

(Continued)

*Primary Examiner*—Yonel Beaulieu
(74) *Attorney, Agent, or Firm*—Martine Penilla & Gencarella LLP

(57) ABSTRACT

A vehicle mode manager that manages vehicle state information is provided. The vehicle mode manager includes a code module that registers an application program with the vehicle mode manager. Registering indicates the application program will be notified of vehicle state changes. Also included in the vehicle mode manager is a code module that receives vehicle status information, and a code module that determines a vehicle state based on both the vehicle status information and a current vehicle state. In addition, a privileged application or another manager can also set the vehicle state. The vehicle mode manager also includes a code module that provides the vehicle state to an application program. In this manner, the application program can react to the vehicle state information in a predefined manner.

16 Claims, 6 Drawing Sheets

OTHER PUBLICATIONS

U.S. Appl. No. 10/104,246, filed Mar. 22,2002, entitled "Java Telematics System Preferences".

U.S. Appl. No. 10/104,243 filed Mar. 22, 2002, entitled "System and Method for Testing Telematics Software".

U.S. Appl. No. 10/104,860, filed Mar. 22, 2002, entitled "System and Method for Simulating an Input to a Telematics System".

U.S. Appl. No. 10/104,294, filed Mar. 22, 2002, entitled "Java Telematics Emulator".

U.S. Appl. No. 10/104,245, filed Mar. 22, 2002, entitled "Abstract User Interface Manager with Prioritization".

* cited by examiner

VEHICLE MODE MANAGER

CROSS REFERENCE TO RELATED APPLICATIONS

This application is related to (1) U.S. patent application Ser. No. 10/104,267, filed Mar. 22, 2002, and entitled "Adaptive Connection Routing Over Multiple Communication Channels," (2) U.S. patent application Ser. No. 10/105,121, filed Mar. 22, 2002, and entitled "Arbitration of Communication Channel Bandwidth," (3) U.S. patent application Ser. No. 10/104,351, filed Mar. 22, 2002, and entitled "System and Method for Distributed Preference Data Services," (4) U.S. patent application Ser. No. 10/104,297, filed Mar. 22, 2002, and entitled "Asynchronous Protocol Framework," (5) U.S. patent application Ser. No. 10/104,298, filed Mar. 22, 2002, and entitled "Business-Model Agnostic Service Deployment Management Service," (6) U.S. patent application Ser. No. 10/104,295, filed Mar. 22, 2002, and entitled "Manager Level Device/Service Arbitrator," (7) U.S. patent application Ser. No. 10/104,246, filed Mar. 22, 2002, and entitled "Java Telematics System Preferences," (8) U.S. patent application Ser. No. 10/104,243, filed Mar. 22, 2002, and entitled "System and Method for Testing Telematics Software," (9) U.S. patent application Ser. No. 10/104,860, filed Mar. 22, 2002, and entitled "System and Method for Simulating an Input to a Telematics System," (10) U.S. patent application Ser. No. 10/104,294, filed Mar. 22, 2002, and entitled "Java Telematics Emulator," and (11) U.S. patent application Ser. No. 10/104,245, filed Mar. 22, 2002, and entitled "Abstract User Interface Manager with Prioritization," which are incorporated herein be reference.

BACKGROUND OF THE INVENTION

1. Field of the Invention

This invention relates generally to telematic devices, and more particularly to a vehicle mode manager capable of managing the state of a vehicle.

2. Description of the Related Art

The electronic content and sophistication of automotive designs has grown markedly. Microprocessors are prevalent in a growing array of automotive entertainment, safety, and control functions. Consequently, this electronic content is playing an increasing role in the sales and revenues of the automakers. The features provided by the electronic content include audio systems, vehicle stability control, driver activated power train controls, adaptive cruise control, route mapping, collision warning systems, security systems, etc. The significant increase of the electronic content of land based vehicles has concomitantly occurred with the explosive growth of the Internet and the associated data driven applications supplied through mobile applications.

Telematics, a broad term that refers to vehicle-based wireless communication systems and information services, promises to combine vehicle safety, entertainment, and convenience features through wireless access to distributed networks, such as the Internet. Telematics offers the promise to move away from the hardware-centric model from audio and vehicle control systems that are built into devices that are custom designed for each vehicle, to infotainment delivered by plug-and-play hardware whose functionality can be upgraded through software loads or simple module replacement. Furthermore, new revenue streams will be opened up to automobile manufacturers and service providers through the products and services made available through telematics.

However, current telematic systems interact with the state of a vehicle on a very limited basis. For example, a telematic system may inform the driver that they are low on fuel, or have a low tire pressure. But current telematic systems generally do not provide vehicle state information to intelligent telematic systems, which are capable of providing additional services based on the vehicle state.

In view of the forgoing, there is a need for systems and methods to manage the vehicle state. The systems and methods should obtain vehicle state information and manage that information by providing the state information to intelligent telematic systems capable of providing additional services based on the state information.

SUMMARY OF THE INVENTION

Broadly speaking, the present invention fills these needs by providing a vehicle mode manager capable of managing vehicle state information and providing the vehicle state information to interested application programs. In one embodiment, a method for providing vehicle state management is disclosed. Vehicle status information is received, and a vehicle state is determined based on the received vehicle status information. The vehicle state then is provided to an application program. In this manner, the application program can react to the vehicle state information in a predefined manner.

A computer program embodied on a computer readable medium for providing vehicle state management is disclosed in an additional embodiment of the present invention. The computer program includes a code segment that receives vehicle status information, and a code segment that determines a vehicle state based on the vehicle status information. A further code segment is included that provides the vehicle state to an application program. As above, the application program can react to the vehicle state information in a predefined manner.

In a further embodiment, a vehicle mode manager is disclosed for providing vehicle state management. The vehicle mode manager includes a code module that registers an application program with the vehicle mode manager. In some embodiments, the code module can register the application program with other software layers related to the vehicle mode manager, such as an open services gateway initiative (OSGI) layer. Registering indicates the application program will be notified of vehicle state changes. Also included in the vehicle mode manager is a code module that receives vehicle status information, and a code module that determines a vehicle state based on both the vehicle status information and a current vehicle state. In addition, the vehicle mode manager includes a code module that provides the vehicle state to an application program. In this manner, the application program can react to the vehicle state information in a predefined manner. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION OF THE PREFERRED EMBODIMENTS

Figure 1:
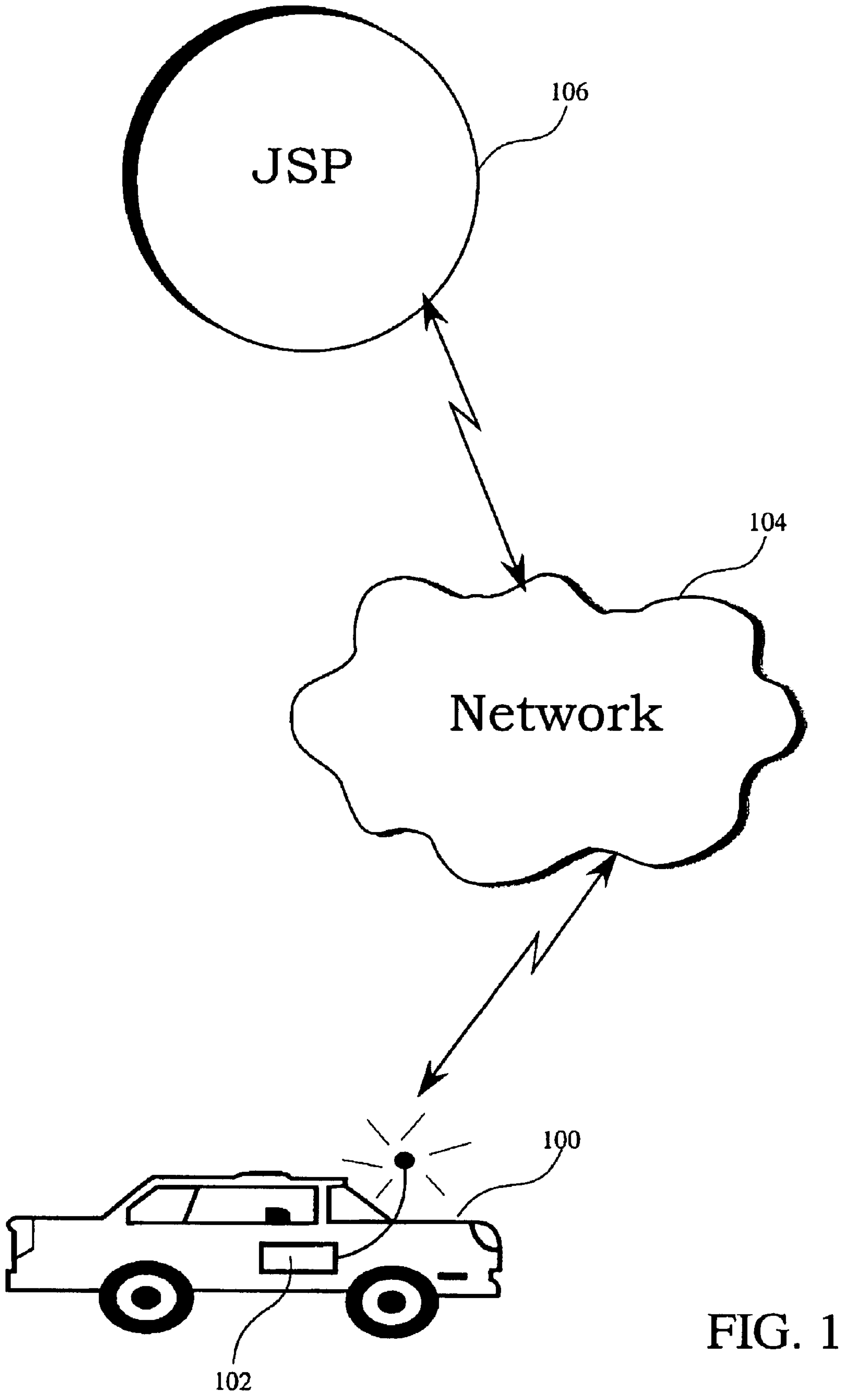
FIG. 1 is a high level schematic overview of an automotive telematics system in accordance with one embodiment of the invention.

An invention is disclosed for a vehicle mode manager. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Embodiments of the present invention provide a mechanism for managing vehicle state information and providing the state information to services that can take appropriate action based on the state information. Broadly speaking, a vehicle state is a logical entity that describes various facts about a vehicle. For example, a normal state may indicate a situation in which a vehicle is turned on, and the ignition and motor are running. A towed state may be described as one in which the vehicle is being towed. The vehicle mode manager of the embodiments of the present invention obtains vehicle status information, determines the vehicle state based on the vehicle status information, and notifies specific vehicle systems, which can take appropriate action based on the vehicle state.

Generally speaking, embodiments of the present invention are implanted in a client side of a telematics system. As will be explained in more detail below, the client side of a telematics system includes a telematics control unit (TCU) that is incorporated into a vehicle system. In one embodiment, the TCU is associated with a user interface (UI) that provides a user with access to control options. It should be appreciated that the user can interact with the TCU through speech recognition, a mouse type device, touch pad or some other suitable mechanism which has a minimal impact on the driver's ability to drive. Of course, a passenger of the vehicle is not limited by the restrictions on the driver with respect to the interaction with the UI.

The TCU can communicate with any of the control systems, safety systems, entertainment systems, information systems, etc., of the vehicle. It will be apparent to one skilled in the art after a careful reading of the present disclosure that the client side stack of the TCU is utilized to access a vehicle interface component for accessing in-vehicle devices, such as the speedometer, revolutions per minute (rpm) indicator, oil pressure, tire pressure, etc. Thus, client side applications sitting in the TCU allow for the functionality with respect to the vehicle systems as well as infotainment applications.

In one embodiment, the telematics system deploys Java technology. It should be appreciated that Java technology's platform-independence and superior security model provide a cross-platform solution for the heterogeneous systems of a vehicle while maintaining a security architecture protecting against viruses and unauthorized access. Thus, the content or service provider is insulated against the myriad of car platforms while vehicle manufacturers are protected against hacker threats. In addition, Java application program interfaces (APIs) are available to support telematics mediums, such as speech recognition through Java Speech API (JSAPI), media delivery through Java Media Framework (JMF) and wireless telephony through Wireless telephony communications APIs (WTCA), etc.

FIG. 1 is a high level schematic overview of an automotive telematics system in accordance with one embodiment of the invention. A client/server architecture relying on standards and principles of modular design allows for functionality of the telematics system to be delivered to the customer through wireless access. The server side includes Java provisioning server (JPS) 106 in communication with network 104. For a detailed description of JPS 106, reference may be made to U.S. patent application Ser. No. 10/104,297, entitled "Asynchronous Protocol Framework," and having inventors Peter Strarup Jensen, Pavel S. Veselov, Shivakumar S. Govindarajapuram, and Shahriar Vaghar, assigned to the assignee of the present application, and which is hereby incorporated by reference.

In one embodiment, the client side includes telematics control unit (TCU) 102 contained within a land based vehicle 100. Of course, the TCU's implementation is not limited to land based vehicles, and is equally applicable to boats, planes, hovercraft, space shuttles, etc., which are all recipients of the technology defined herein. TCU 102 is enabled to communicate with network 104 through wireless access. Of course, the network 104 can be any distributed network such as the Internet and the wireless access protocol (WAP) can be any suitable protocol for providing sufficient bandwidth for TCU 102 to communicate with the network. It should be appreciated that the client/server architecture of FIG. 1 allows for the evolution from hard wired, self-contained components to platform based offerings relying on software and upgrades. Thus, a service provider controlling the JPS 106 can deliver an unbundled, open end-to-end solution enabling plug-and-play applications. For example, the service can be a tier-based service similar to home satellite and cable services. It will be apparent to one skilled in the art that an open platform, such as frameworks based on Java technology, enables a developer to create executable applications without regard to the underlying hardware or operating system.

Figure 2:
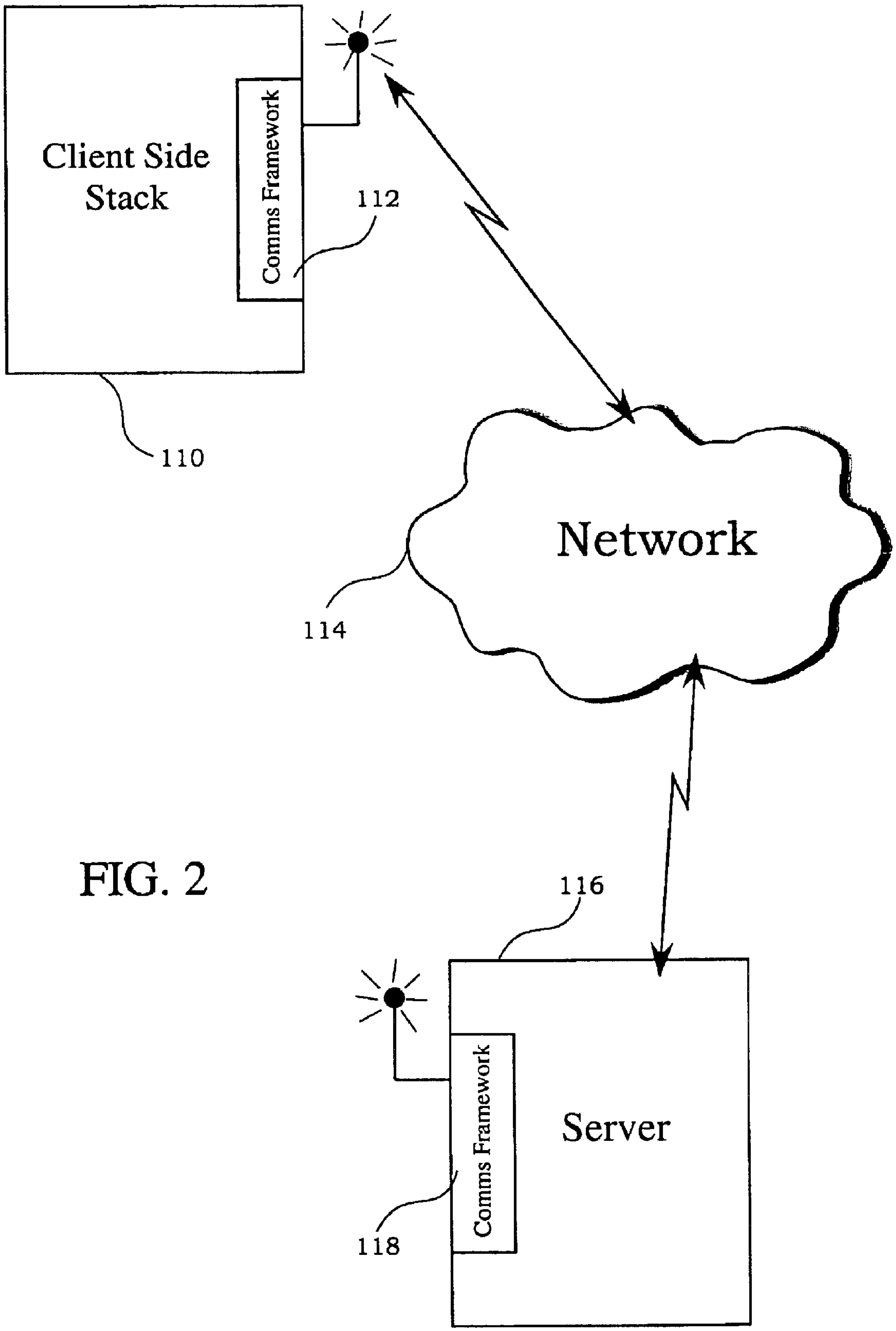
FIG. 2 is a schematic diagram of a telematics client communicating through a wireless network with a telematics server in accordance with one embodiment of the invention.

FIG. 2 is a schematic diagram of a telematics client communicating through a wireless network with a telematics server in accordance with one embodiment of the invention. A client side stack 110 includes the necessary layers for a client application, also referred to as a manager or a carlet, to be executed to provide functionality. As will be explained further below, the carlet has access to each layer of the client side stack 110. Included in client side stack 110 is client communication framework 112. Client communication framework 112 enables communication between the client side stack 110 and an application on server 116 through network 114.

It should be appreciated that the server 116 is not limited to a wireless connection. For example, the server 116 can be hard-wired into network 114. One skilled in the art will appreciate that where server 116 communicates through a wireless connection with network 114, the communication proceeds through server communication framework 118. With respect to an embodiment where server 116 is hard-wired to network 114, the server can communicate with network 114 through a network portal (e.g., the Internet) rather than server communication framework 118. Additionally, network 114 can be any suitable distributed network, such as the Internet, a local area network (LAN), metropolitan area network (MAN), wide area network (WAN), etc.

Figure 3:
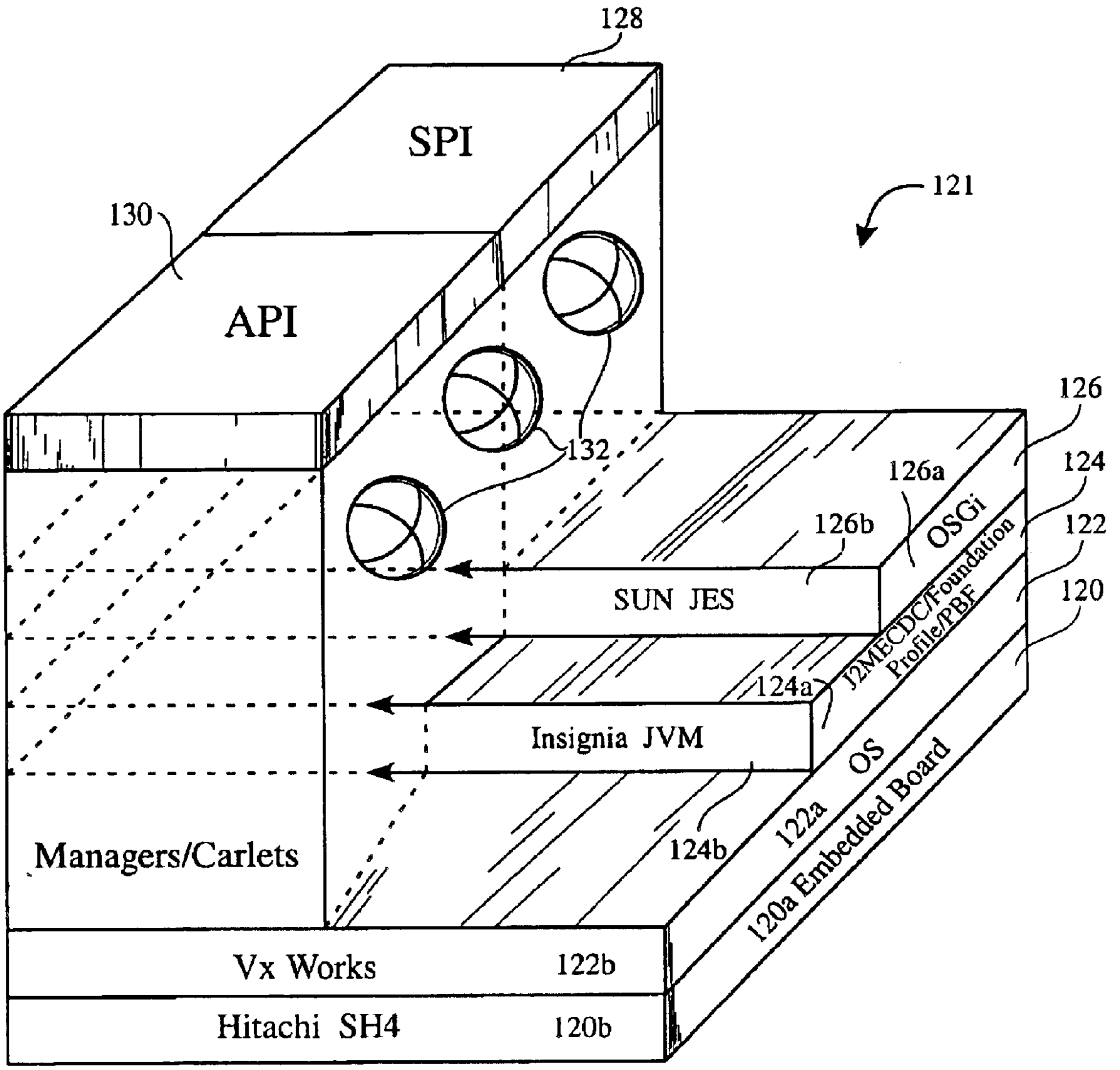
FIG. 3 is a three dimensional pictorial representation of a telematics client reference implementation of the client side stack of FIG. 2 in accordance with one embodiment of the invention.

FIG. 3 is a three dimensional pictorial representation of a telematics client implementation of the client side stack of FIG. 2 in accordance with one embodiment of the invention. Client side implementation 121 includes hardware layer 120 of the client, which can include an embedded board containing a telematics control unit (TCU). As mentioned above, with reference to FIG. 1, the TCU is incorporated into a land based vehicle. In one embodiment, the TCU is in communication with the electronic components of a vehicle through a vehicle bus, or by other means. These components include the measurement of vehicle operating and safety parameters, such as tire pressure, speed, oil pressure, engine temperature, etc., as well as information and entertainment components, such as audio system settings, Internet access, environmental control within the cabin of the vehicle, seat positions, etc. One skilled in the art will appreciate that the telematics control unit is capable of integrating the functionality of various handheld information and entertainment (infotainment) devices, such as mobile phones, personal digital assistants (PDA), MP3 players, etc.

Still referring to FIG. 3, an operating system layer 122 is above the hardware layer 120. In addition, a Java virtual machine (JVM) layer 124 is above the operating system (OS) layer 122 and an open services gateway initiative (OSGI) layer 126 is located above the JVM layer 124. It should be appreciated that the standard for JVM layer 124 can include the Java 2 Platform Micro Edition (J2ME), Connected Device Configuration (CDC), Foundation Profile, Personal Profile, or Personal Basis Profile. One skilled in the art will appreciate that J2ME Foundation Profile is a set of APIs meant for applications running on small devices that have some type of network connection, while J2ME Personal Profile provides the J2ME environment for those devices with a need for a high degree of Internet connectivity and web fidelity.

The exemplary standards for each of the layers of the stack are provided on the right side of client side reference implementation 121. In particular, OSGI **126*a*, J2ME 124*a*, OS 122*a*, and embedded board 120*a* are standards and to the left of the standards are examples of actual products that implement the standards. For example, OSGI 126*a* standard is implemented by Sun's Java Embedded Server (JES) 2.1 126*b*, J2ME 124*a* standard is implemented by Insignia's Virtual Machine 124*b*, OS 122*a* is implemented by Wind River's VxWorks real time operating system 122*b*, and embedded board 120*a*** is an embedded personal computer based board such as Hitachi's SH4. It should be appreciated that the actual products are exemplary only and not meant to be limiting as any suitable product implementing the standards can be utilized.

Carlets 132 of FIG. 3, have access to each layer above and including OS layer 122. Application program interface (API) layer 130 is the layer that carlets use to communicate with the JTC. Service provider interface (SPI) layer 128 is a private interface that managers have among each other. One skilled in the art will appreciate OSGI layer 126 provides a framework upon which applications can run. Additional functionality over and above the JVM, such as lifecycle management, is provided by OSGI layer 126. It should be appreciated that the open services gateway initiative is a cross-industry working group defining a set of open APIs for a service gateway for a telematics system. These APIs consist of a set of core framework APIs. In order to deploy services and their implementations, OSGi defines a packaging unit called a service bundle. A service bundle is a Java Archive (JAR) file containing a set of service definitions along with their corresponding implementation. Both infrastructure services and carlets are deployed as service bundles. Some of the functionality for arbitrating, controlling and managing devices and resources, e.g., speakers cell phones, etc., is provided by OSGI layer 126. However, one skilled in the art will appreciate that separate arbitration services may also be required.

As used herein, a carlet is a Java™ application. For each function or task to be processed on the client side or between the client and server sides, a carlet is invoked to manage the operation. In this manner, carlets can be independently written, tested, and launched for use on a telematics system. By way of example, a carlet can be written to control or monitor the activity of automobile components (e.g., tires, engine oil, wiper activity, steering tightness, maintenance recommendations, air bag control, transmission control, engine temperature monitoring, etc.), and to control or monitor applications to be processed by the telematics control unit (TCU) and interacted with using the on-board automobile monitor. As such, specialized carlets can be written to control the audio system, entertainment modules (e.g., such as on-line games or movies), voice recognition, telecommunications, email communications (text and voice driven), etc. Accordingly, the type of carlets that can be written is unlimited.

Figure 4:
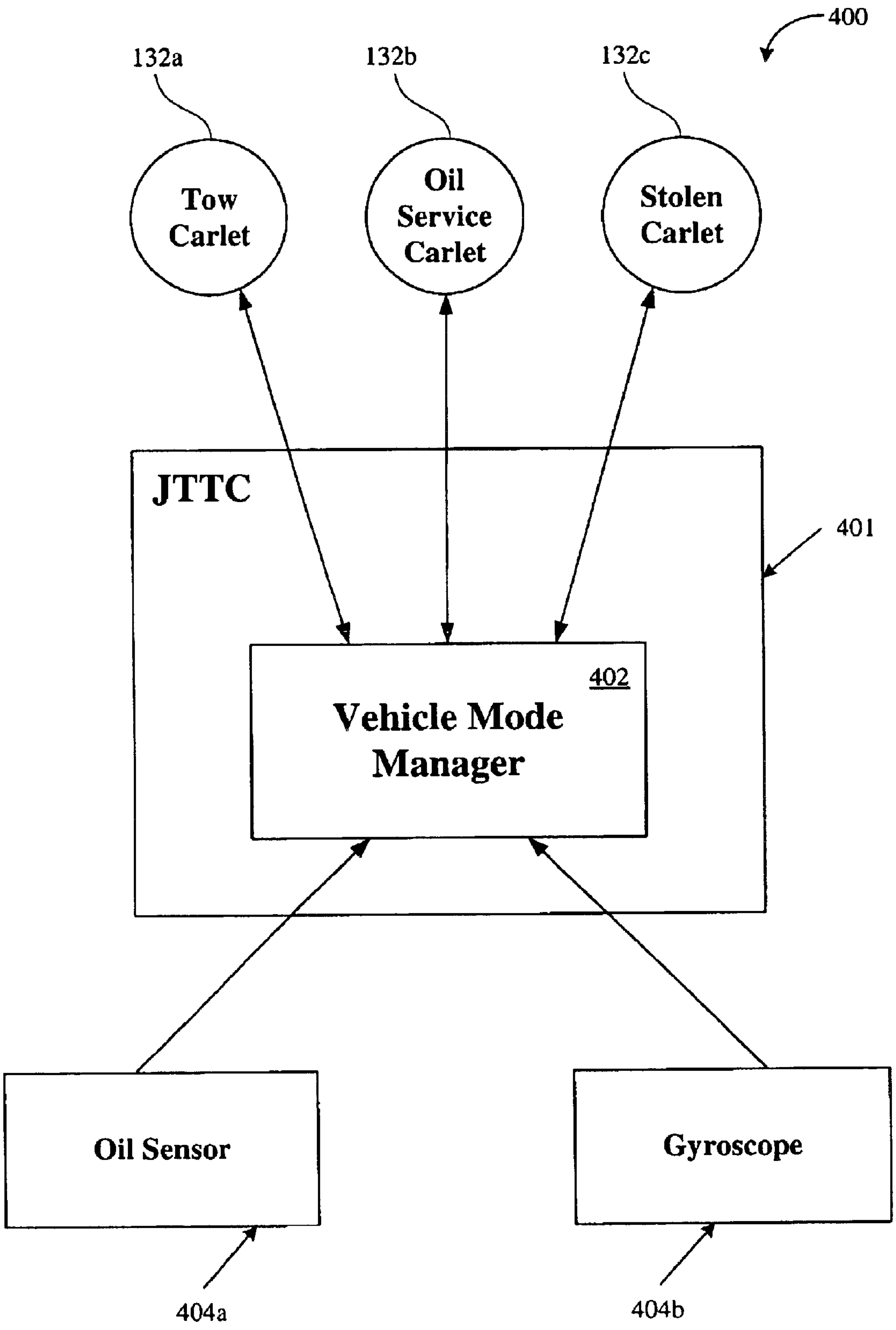
FIG. 4 is a block diagram showing an in-vehicle vehicle mode management system, in accordance with an embodiment of the present invention.

As mentioned previously, embodiments of the present invention provide a vehicle mode manager that defines various states in which a vehicle can be in and allows vehicle systems to react to these states. FIG. 4 is a block diagram showing an in-vehicle vehicle mode management system 400, in accordance with an embodiment of the present invention. As shown in FIG. 4, the exemplary vehicle mode management system 400 includes a vehicle mode manager 402 executed within a Java telematics layer 401. In one embodiment, the Java telematics layer 401 forms a portion of the OSGI layer described above. As mentioned above, the OSGI layer provides a framework upon which applications can run, and includes additional functionality over and above the JVM, such as lifecycle management. In communication with the vehicle mode manager 402 is a plurality of application programs, or carlets **132*a*–132*c*, which as described in greater detail subsequently, provide various vehicle services based on the vehicle state or mode. The vehicle mode manager 402 is further in communication with a plurality of vehicle sensors 404*a*–404*b***.

In operation, the vehicle mode manager 402 defines various states in which the vehicle can be in and allows carlets **132*a*–132*c* and other vehicle systems to react to the defined states. Generally speaking, the vehicle mode manager 402 can detect, using various criteria, changes in the vehicle status. In addition, the vehicle status can be set by carlets 132*a*–132*c* or application service programs, which themselves may be executed on the vehicle client or on the telematic server. Once the vehicle state, or mode, is defined by the vehicle mode manager 402, interested applications can be notified of the vehicle state, and take appropriate action. In one embodiment, interested applications are application programs that are registered with the vehicle mode manager 402. Then, whenever the state changes, or when queried by a registered application program, the vehicle mode manager 402** can provide the vehicle state information to any registered application programs.

For example, the exemplary vehicle mode management system 400 illustrated in FIG. 4 shows two sensors 404*a*–404*b* in communication with the vehicle mode manager 402. In operation, the vehicle mode manager 402 receives vehicle status information from the vehicle sensors 404*a*–404*b* and uses the received vehicle status information to determine the current vehicle state. For example, the oil sensor 404*a* can provide the vehicle mode manager 402 with "low oil" status information. The vehicle mode manager 402 then utilizes the low oil status information received from the oil sensor 404*a*, in conjunction with other obtained vehicle status information, to calculate the current vehicle state.

The vehicle mode manager 402 can then provide the current vehicle state to registered application programs. For example, based on the "low oil" status information, the vehicle mode manager 402 may set the vehicle state to "check fluids," and provide the "check fluids" state to the registered carlets 132*a*–132*b*. In this example, the oil service carlet 132*b* may react to the new "check fluids" state by displaying the oil level to the user. In addition, the tow carlet 132*a* and the stolen carlet 132*c* may take no action, for example, because the services provide by these carlets may not be related to the "check fluids" state.

As mentioned above, the current vehicle state can be set using carlets and/or application service programs. For example, the user's preference information can be stored on the telematic server. This information can include, for example, the date of the vehicle's last oil change and the frequency of the vehicle's oil changes. Based on this user preference information, an application service program executing on the telematics server may calculate the date of the next scheduled oil change for the vehicle and provide that information to the oil service carlet 132*b*. When the oil service carlet 132*b* is notified of the next oil change, the oil service carlet 132*b* can set the vehicle state, for example, to the "check fluids" state.

Figure 5:
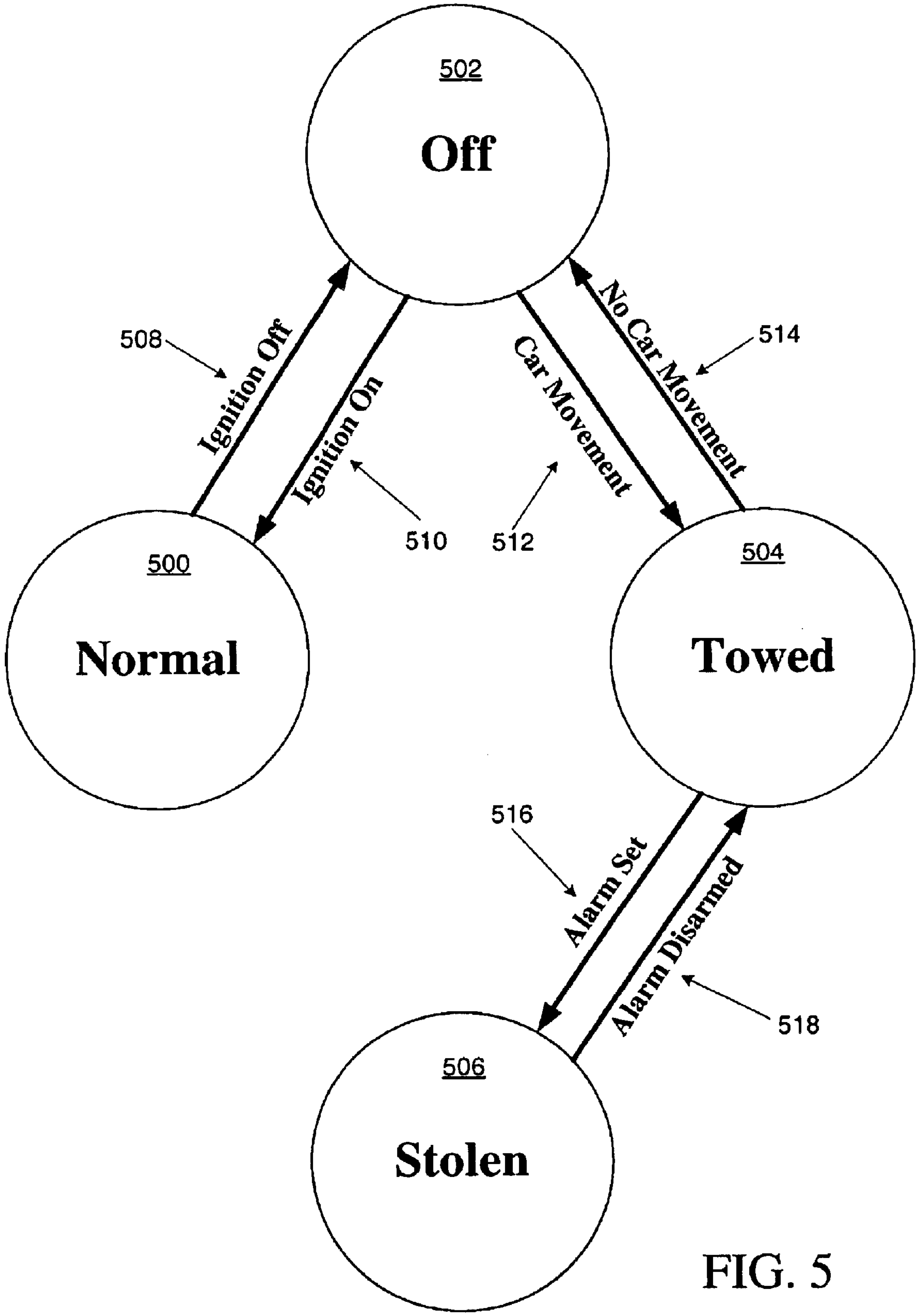
FIG. 5 is a state diagram showing exemplary vehicle state relationships based on vehicle status information, in accordance with an embodiment of the present invention.

In addition, the vehicle mode manager 402 can utilize the current vehicle state in conjunction with new vehicle status information to determine the new vehicle state. FIG. 5 is a state diagram showing exemplary vehicle state relationships based on vehicle status information, in accordance with an embodiment of the present invention.

FIG. 5 illustrates four exemplary vehicle states, namely, Normal 500, Off 502, Towed 504, and Stolen 506. For example, the Normal 500 vehicle state can be defined as the vehicle is turned on, and the ignition and motor are running. The Off 502 vehicle state can be defined as the car is turned off and not moving. The Towed 504 vehicle state can be defined as the vehicle is off and moving when the vehicle alarm is off, and the Stolen 506 vehicle state can be defined the vehicle being taken away unlawfully without consent of the owner. Although only four vehicle states are depicted in FIG. 5, it should be noted that any number of vehicle states can be defined for a particular vehicle. As described below, based on the current vehicle state and received vehicle status information, the vehicle mode manager can set the new vehicle state.

For example, when the vehicle is currently in the Normal vehicle state 500, and the vehicle mode manager receives "ignition off" 508 vehicle status information, the vehicle mode manager can change the vehicle state to Off 502. Similarly, when the vehicle is currently in the Off vehicle state 502, and the vehicle mode manager receives "ignition on" 510 vehicle status information, the vehicle mode manager can change the vehicle state to Normal 500.

In another example, the vehicle may be equipped with a gyroscope 404*b*, as shown in FIG. 4. As will be appreciated by those skilled in the art, a gyroscope 404*b* can be utilized to detect vehicle movement. Referring back to FIG. 5, in one embodiment, when the vehicle is in the Off 502 state, the vehicle mode manager detects vehicle movement using the gyroscope 404*b*. In particular, when the gyroscope 404*b* senses vehicle movement, the gyroscope 404*b* can provide "car movement" status information the vehicle mode manager. As will be appreciated by those skilled in the art, additional criteria can be used to determine if a car is towed, for example, requiring only two wheels are moving.

Hence, when the vehicle is currently in the Off 502 state, and the vehicle mode manager receives "car movement" 512 vehicle status information, the vehicle mode manager can change the vehicle state to Towed 504, which indicates the vehicle is being moved while not running. Similarly, when the vehicle is currently in the Towed 504 state, and the vehicle mode manager receives "no car movement" 514 vehicle status information, the vehicle mode manager can change the vehicle state to Off 502. However, a towed vehicle may actually be stolen, without the consent of the owner.

In one embodiment, the vehicle mode manager can receive vehicle status information from a vehicle alarm unit. For example, the vehicle alarm unit may provide the vehicle mode manger with "alarm set" 516 vehicle status information, which indicates the user has set the vehicle alarm, and all vehicle movement when the alarm is set indicates unlawful vehicle tampering. In this embodiment, when the vehicle is currently in the Towed 502 state, and the vehicle mode manager has received "alarm set" 516 vehicle status information, the vehicle mode manager can change the vehicle state to Stolen 506, which indicates the vehicle is being moved while not running, and without the owner's consent. Similarly, when the vehicle is currently in the Stolen 506 state, and the vehicle mode manager receives "alarm disarm" 518 vehicle status information, the vehicle mode manger can change the vehicle state to Towed 504, generally indicating the alarm was triggered accidentally, but the owner quickly disarmed the alarm to correct the mistake. Other embodiments could require additional vehicle status information to return the vehicle from the Stolen 506 state, such as a user password.

As mentioned previously, application programs can react to the current state. For example, referring to FIG. 4, the stolen carlet 132*c* may react to the stolen 506 vehicle state by sending a message to a "car stolen" application service program executing on the telematic server. The car stolen application service program can then send a page or other message to the owner to warn the owner of their current vehicle state.

Figure 6:
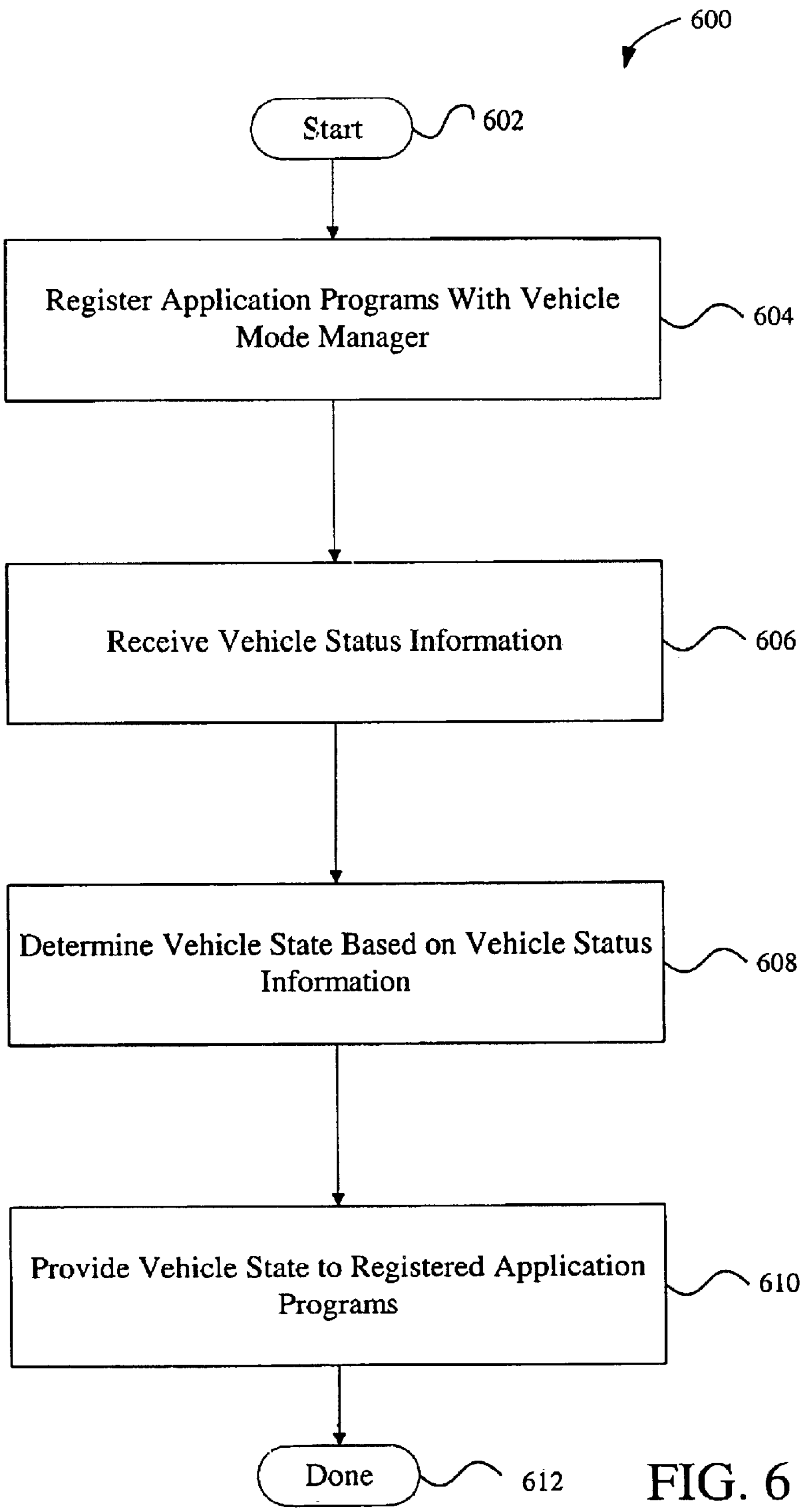
FIG. 6 is a flowchart showing a method for providing vehicle state management, in accordance with an embodiment of the present invention.

FIG. 6 is a flowchart showing a method 600 for providing vehicle state management, in accordance with an embodiment of the present invention. In an initial operation 602, preprocess operations are performed. Preprocess operations can include vehicle client provisioning, gathering of user preference information, and other preprocess operations that will be apparent to those skilled in the art after a careful reading of the present disclosure.

In operation 604, application programs are registered with the vehicle mode manager. As mentioned above, once the vehicle state is defined by the vehicle mode manager, interested applications can be notified of the vehicle state, and take appropriate action. In one embodiment, interested applications are application programs that are registered with the vehicle mode manager. Then, whenever the state changes, or when queried by a registered application program, the vehicle mode manager can provide the vehicle state information to any registered application programs, as described subsequently.

Vehicle status information is then received, in operation 606. The vehicle mode manager receives vehicle status information from the vehicle sensors, and other application programs, and uses the received vehicle status information to determine the current vehicle state, as described below. In addition, the current vehicle state can be set using carlets and/or application service programs. For example, the user's preference information can be stored on the telematic server. This information can include, for example, the date of the vehicle's last oil change and the frequency of the vehicle's oil changes. Based on this user preference information, an application service program executing on the telematics server may calculate the date of the next scheduled oil change for the vehicle and provide that information to the oil service carlet. When the oil service carlet is notified of the next oil change, the oil service carlet can set the vehicle state, for example, to the "check fluids" state.

In operation 608, the vehicle mode manager determines the vehicle state based on the vehicle status information. Continuing with the previous example, the oil sensor can provide the vehicle mode manager with "low oil" status information. The vehicle mode manager then utilizes the low oil status information received from the oil sensor, in conjunction with other obtained vehicle status information, to calculate the current vehicle state. In addition, as described above with reference to FIG. 5, the vehicle mode manager can utilize the current vehicle state in conjunction with new vehicle status information to determine the new vehicle state.

Referring back to FIG. 6, the vehicle state is provided to registered application programs, in operation 610. For example, based on the "low oil" status information, the vehicle mode manager may set the vehicle state to "check fluids," and provide the "check fluids" state to the registered application programs. In this example, an oil service carlet may react to the new "check fluids" state by displaying the oil level to the user, while a tow carlet and a stolen carlet may take no action, for example, because the services provide by these carlets may not be related to the "check fluids" state.

Post process operations are performed in operation 612. Post process operations can include further application program registration and other post process operations that will be apparent to those skilled in the art after a careful reading of the present disclosure. It should be noted that vehicle states, or modes, can be predefined, such Normal, Towed, and Stolen. Further vehicle states, or modes, can be defined after provisioning as needed to react to new software, new hardware, and new service subscriptions.

As mentioned above, embodiments of the present invention can be implemented in a Java environment using a Java virtual machine. As an overview, the Java virtual machine (JVM) is used as an interpreter to provide portability to Java applications. In general, developers design Java applications as hardware independent software modules, which are executed by Java virtual machines. The Java virtual machine layer is developed to operate in conjunction with the native operating system of the particular hardware on which the communications framework 516*c* is to run. In this manner, Java applications (e.g., carlets) can be ported from one hardware device to another without requiring updating of the application code.

Unlike most programming languages, in which a program is compiled into machine-dependent, executable program code, Java classes are compiled into machine independent byte-code class files which are executed by a machine-dependent virtual machine. The virtual machine provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "bytecode". The bytecode is then converted (interpreted) into machine code at runtime. Upon finding a Java applet, the Web browser invokes a Java interpreter (Java Virtual Machine), which translates the bytecode into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Although the present invention is described based on the Java programming language, other programming languages may be used to implement the embodiments of the present invention, such as other object oriented programming languages. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software application can be written using an object-oriented programming language whereby the program's functionality is implemented using objects. Examples of object-oriented programming languages include C++ as well as Java.

Furthermore the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the TCU discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing vehicle state management, comprising the operations of:

registering an application program with a vehicle mode manager, wherein registering indicates the application program will be notified of vehicle state changes;

receiving vehicle status information for a specific point in time;

determining a new vehicle state based on the vehicle status information and a current vehicle state; and providing the new vehicle state to the application program, wherein the application program reacts to the new vehicle state in a predefined manner.

2. A method as recited in claim 1, wherein the vehicle status information is received from a vehicle sensor device.

3. A method as recited in claim 1, wherein the vehicle status information is received from an application service program.

4. A method as recited in claim 3, wherein the application service program is executed on a telematic server.

5. A method as recited in claim 3, wherein the application service program is executed on a vehicle client program.

6. A method as recited in claim 5, wherein the application service program monitors a vehicle sensor.

7. A computer program embodied on a computer readable medium for providing vehicle state management, comprising:

a code segment that registers an application program with a vehicle mode manager, wherein registering indicates the application program will be notified of vehicle state changes;

a code segment that receives vehicle status information for a specific point in time;

a code segment that determines a new vehicle state based on the vehicle status information and a current vehicle state; and a code segment that provides the vehicle state to the application program, wherein the application program reacts to the new vehicle state in a predefined manner.

8. A computer program as recited in claim 7, wherein the vehicle status information is received from a vehicle sensor device.

9. A computer program as recited in claim 7, wherein the vehicle status information is received from an application service program.

10. A computer program as recited in claim 9, wherein the application service program is executed on a telematic server.

11. A computer program as recited in claim 9, wherein the application service program is executed on a vehicle client program.

12. A computer program as recited in claim 11, wherein the application service program monitors a vehicle sensor.

13. A vehicle mode manager for providing vehicle state management, comprising:

a code module that registers an application program with the vehicle mode manager, wherein the application program is executed local to a vehicle on which the vehicle mode manager is executed, and wherein registering indicates the application program will be notified of vehicle state changes;

a code module that receives vehicle status information for a specific point in time;

a code module that determines a new vehicle state using the vehicle mode manager based on both the vehicle status information and a current vehicle state; and a code module that provides the new vehicle state to an application program, wherein the application program reacts to the new vehicle state in a predefined manner.

14. A vehicle mode manager as recited in claim 13, wherein the vehicle status information is received from a vehicle sensor device.

15. A vehicle mode manager as recited in claim 13, wherein the vehicle status information is received from an application service program.

16. A vehicle mode manager as recited in claim 15, wherein the application service program monitors a vehicle sensor.

* * * * *